(12) United States Patent
Bryant

(10) Patent No.: US 7,254,933 B2
(45) Date of Patent: Aug. 14, 2007

(54) ANTI-COLLAPSE SYSTEM AND METHOD OF MANUFACTURE

(75) Inventor: Michael J. Bryant, Dundee (GB)

(73) Assignee: Deepflex Inc., Houston, TX (US)

(*) Notice: Subject to any disclaimer, the term of this patent is extended or adjusted under 35 U.S.C. 154(b) by 160 days.

(21) Appl. No.: 11/123,033

(22) Filed: May 6, 2005

(65) Prior Publication Data

US 2006/0249215 A1  Nov. 9, 2006

(51) Int. Cl.
D02G 3/36 (2006.01)
(52) U.S. Cl. ...................................... 57/232
(58) Field of Classification Search ................ 57/210, 57/230, 232–235; 138/129, 132
See application file for complete search history.

(56) References Cited

U.S. PATENT DOCUMENTS

| 3,112,234 | A |   | 11/1963 | Krupp |
| 3,189,510 | A |   | 6/1965 | Eldred |
| 3,357,456 | A |   | 12/1967 | Grawey et al. |
| 3,616,123 | A |   | 10/1971 | Reynolds, Jr. et al. |
| 3,770,541 | A |   | 11/1973 | Gilbu |
| 3,790,438 | A |   | 2/1974 | Lewis et al. |
| 3,921,674 | A |   | 11/1975 | Logan et al. |
| 3,936,336 | A | * | 2/1976 | Phillips ........................ 156/86 |
| 3,982,982 | A |   | 9/1976 | Chudgar |
| 4,013,102 | A |   | 3/1977 | DeLorean et al. |
| 4,136,715 | A |   | 1/1979 | McCormack et al. |
| 4,175,992 | A |   | 11/1979 | Grawey |
| 4,258,756 | A |   | 3/1981 | Gilman et al. |
| 4,262,704 | A |   | 4/1981 | Grawey |
| 4,457,068 | A |   | 7/1984 | Maier, Jr. |
| 4,499,144 | A | * | 2/1985 | van Rijswijk ................ 428/376 |
| 4,822,444 | A |   | 4/1989 | Weingart et al. |
| 4,830,694 | A |   | 5/1989 | Kanao |
| 5,261,462 | A |   | 11/1993 | Wolfe et al. |
| 5,435,867 | A |   | 7/1995 | Wolfe et al. |
| 6,327,841 | B1 | * | 12/2001 | Bertini et al. .................. 57/210 |
| 6,418,704 | B2 | * | 7/2002 | Bertini et al. .................. 57/210 |
| 6,474,057 | B2 | * | 11/2002 | Bertini et al. .................. 57/210 |
| 6,491,779 | B1 |   | 12/2002 | Bryant |
| 6,640,533 | B2 | * | 11/2003 | Bertini et al. .................. 57/210 |
| 6,804,942 | B2 |   | 10/2004 | Bryant |

* cited by examiner

Primary Examiner—Shaun R. Hurley
(74) Attorney, Agent, or Firm—Pravel Intellectual Property Law, P.C.; James W. Pravel

(57) ABSTRACT

A reinforced flexible pipe having a tubular core member and a plurality of reinforcing tape members wrapped on the core member; the innermost tape member includes a plurality of openings that communicate with the external surface of the core member; and a polymer material embedded in the openings in the tape such that the polymer material contacts the core member and the tape to improve the hoop strength and the collapse resistance of the pipe. The polymer layer may also be bonded to the outer reinforcing tape to provide abrasion resistance to the reinforced flexible pipe.

10 Claims, 3 Drawing Sheets

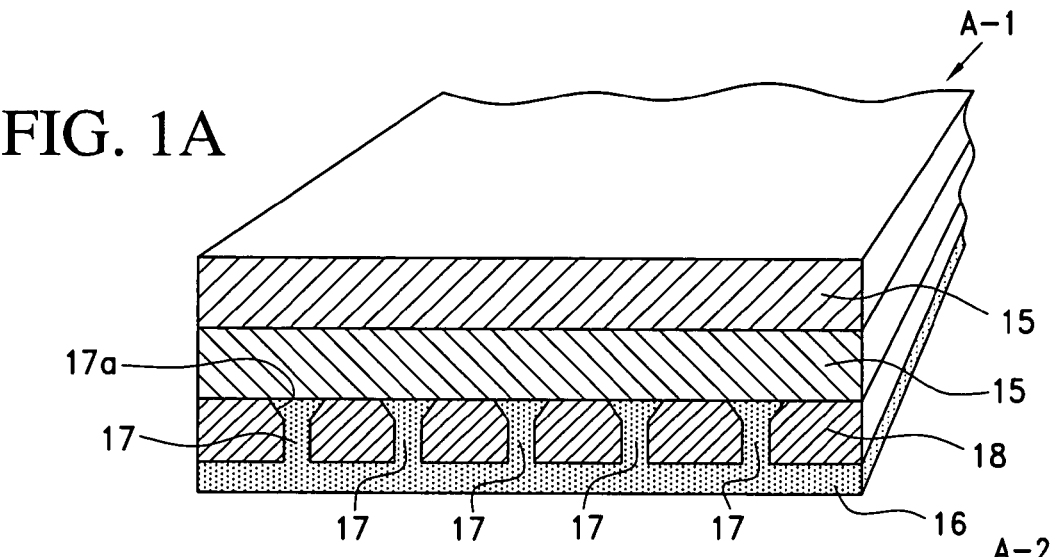
FIG. 1A
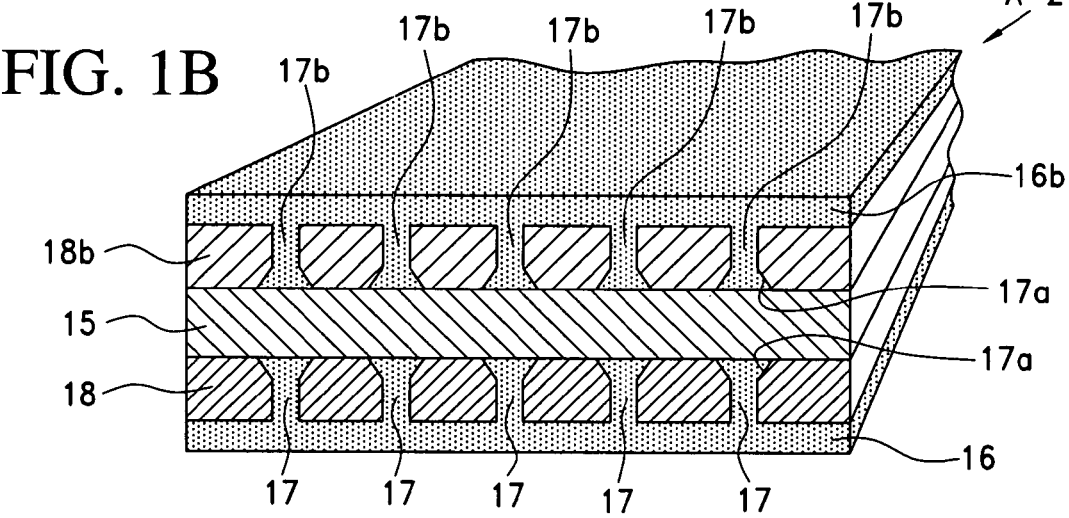
FIG. 1B
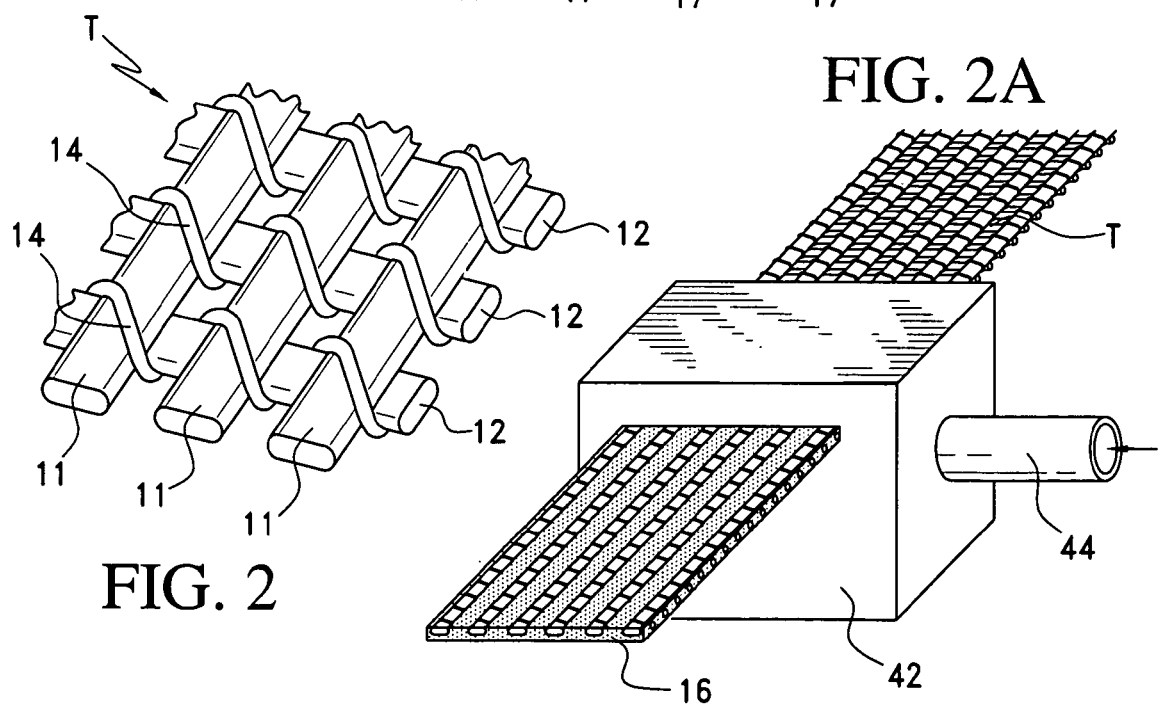
FIG. 2
FIG. 2A

ANTI-COLLAPSE SYSTEM AND METHOD OF MANUFACTURE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The field of the invention is reinforced tapes used with tubing or flexible pipe for conducting petroleum or other fluids subsea or on land and the method of manufacture.

2. Description of the Related Art

This is an improvement on the invention disclosed in U.S. Pat. No. 6,491,779. When the pipe disclosed therein is used to transport compressed gas, some gas can permeate through the inner core or the pipe over time and gather between the inner core and extrusions causing a steady rising inward pressure on the core. Although not in itself a problem under normal circumstances, this can cause a problem if the pressure in the bore of the pipe is released more quickly than the pressure between the layers. When that happens, the inner core can collapse due to the adverse pressure differential and its poor hoop strength. Some degree of protection can be provided to pipes by relieving the pressure between the two extrusions through a valve or valves in the end fittings but this is insufficient for all circumstances and collapse of the inner core may still occur.

Pipe collapse has happened in the past with prior art pipes that have steel based flexible pipes and therefore prior art pipes used for gas transmission are normally constructed using a central interlocking metallic carcass under the inner core. The metallic carcass provides sufficient radial strength to withstand any collapse forces generated by the scenario described above but the overall diameter of the pipe necessarily requires an increase of twice the thickness of the carcass. Furthermore, the inclusion of a carcass increases each reinforcement layer for the same performance because the reinforcement layers have to be wound on larger diameters.

BRIEF SUMMARY OF THE INVENTION

The method and device made according to this inventive method, are described below based on the inventive method of securing the inner core or pipe to the first layer of reinforcement thus preventing the inner core from collapsing when pressure on its outside surface is greater than in its bore. By securing the inner core or pipe to the first layer of reinforcement, its collapse pressure then becomes the sum of the inner core collapse pressure and that of the first reinforcement which can be wound either as pressure reinforcement or as a hoop layer.

The present inventive method improves upon a polymeric tubular core that is subject to internal fluid pressure, and which has a plurality of reinforcing tapes wrapped thereon for resisting the internal fluid pressure, such as is shown in U.S. Pat. No. 6,491,779. Each tape which is in contact with the core has an inner surface in contact with the external surface of the core.

The improvement comprises forming a plurality of laterally spaced openings in the tape, each of which is in communication with the external surface of the core; embedding a polymer in the laterally spaced openings; and bonding the embedded polymer in the tape to the polymer of the core, whereby a collapse of the core is prevented when a reduction in internal fluid pressure in the core occurs.

The bonding may be accomplished by welding the embedded polymer in the tape to the polymer of the core by applying heat, or by applying an adhesive between the embedded polymer in the tape and the polymer of the core, or by other bonding methods.

By using this method, the bore of the pipe remains smooth as opposed to being corrugated which improves the fluid or gas flow and prevention of liner collapse then becomes a matter of choosing suitable reinforcement strength while ensuring that the lower tape with its integral polymer layer does not part from the core or pull apart under the expected forces.

From a practical standpoint, most polymer cores are usually difficult if not impossible to bond to, and where this is the case, a preferred method is to make the first tape in each reinforcement tape stack wound onto the core with the same or compatible polymer attached to its lower surface so that the reinforcement stack can be welded or bonded to the outside diameter of the core. Sometimes it is possible to bond similar polymers together but it is preferable that localized heat will be applied to the interface between the tape and the outer surface of the core and the pressure generated during the wrapping process will be used to bond the assemblies together.

Polymer tapes locked to reinforcing tapes can also be used on the outside of a reinforcement layer to provide an outer jacket that provides a wear coating or a corrosion barrier to protect the inner layers of the pipe.

BRIEF DESCRIPTION OF THE DRAWINGS

FIG. 1A is a view of an embodiment of the invention showing the inner layer.

FIG. 1B is a view of an embodiment of the invention showing the inner layer and the outer jacket.

FIG. 2 is an isometric view of a typical fiber arrangement for the tape of an embodiment of this invention.

FIG. 2A is an isometric view of a method of constructing an embodiment of the invention with an extrusion device.

DETAILED DESCRIPTION OF THE INVENTION

Figure 3:
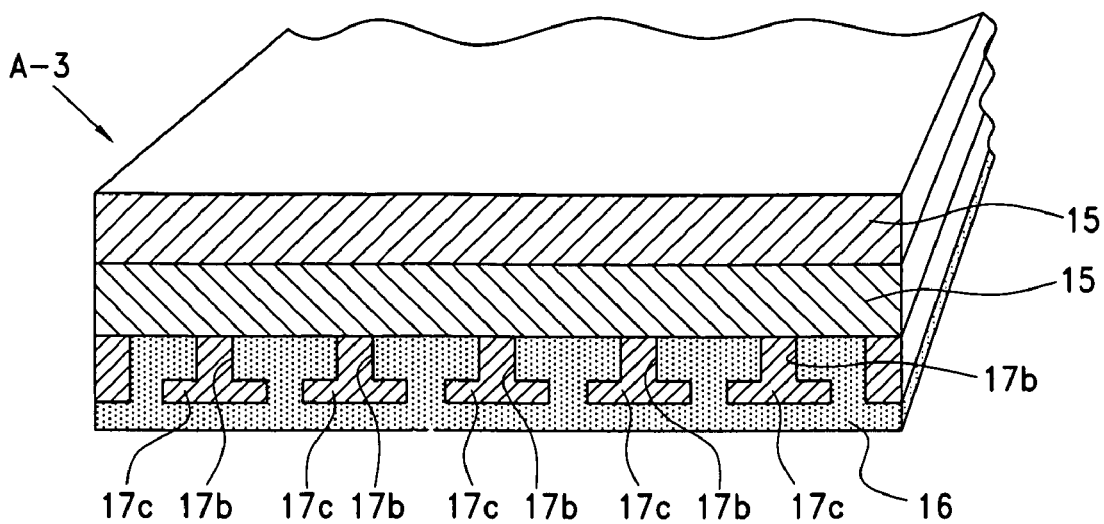
FIG. 3 is a view of an embodiment of the invention showing the inner layer and rivet shaped openings in the perforated laminate.

Referring now to FIG. 1A, the letter A-1 generally refers to a plurality of superimposed tapes 15, with an inner tape 18 which initially has a plurality of perforations 17 which are spaced apart laterally and may be formed by punching or by otherwise forming them longitudinally in the tape 18. The tape 18 has a polymer or other extrudeable material filling in the perforations 17 and preferably also has a substantially continuous polymer layer 16 bonded thereto. The tape 18 in this invention may be a reinforcing tape, a bondable tape, a low volume fraction tape, or a zero volume fraction tape. The volume fraction of fiber in a tape, as is known in the art, is equal to the volume of fiber divided by the sum of the volume of fiber plus the volume of matrix, where the matrix is usually resin. In other words, low volume fraction tape is generally a tape with a relatively small amount of fibers while a zero volume tape is generally a tape with no fibers at all.

The perforations or initial voids 17 in the tape 18, when filled with polymer, act as "rivets" or wedges to more securely bond the polymer of the tape 18 to the core C, and to thereby serve to prevent the collapse of the core C. Preferably, the shape of the perforations 17 for the polymer therein are formed with tapered surfaces 17a that extend upwardly and outwardly as shown in FIG. 1A so that the cured polymer in the perforations 17 locks and holds the core C to the tape 18 when they are bonded together to prevent collapse of the core C when the fluid pressure in the core C is sufficiently low enough to cause a collapse to occur. The polymer layer 16 is located on the lowermost side of the tape A. One or more laminates or layers 15 are then applied to the top of the tape 18 to provide hoop strength or other reinforcement.

An alternative embodiment of the tape A-2 of the invention is shown in FIG. 1B wherein a polymer layer 16 is located below laminate 18 and below a laminate 15. In addition, a polymer layer 16b is located above the upper tape 18b, which is above laminate 15. Multiple layers or laminates 15 may also be used. Instead of polymer layers 16 or 16b, alternative materials may also be used that are compatible with the material composition of the tube or core C. The embodiment in FIG. 1B may also be constructed without any resin or adhesive or other material between the upper perforated laminate 18b, the laminate 15 and the lower perforated laminate 18 so that the layers can slide relative to each other to reduce the stiffness of the laminates 15 relative to the perforated laminates 18 and 18b interface and therefore improve the flexibility of the entire assembly of tapes A on pipe C.

In FIG. 2 a stitched or woven fiber tape T referred to in the inventor's U.S. Pat. Nos. 6,491,779 and 6,804,942 is shown. U.S. Pat. Nos. 6,491,779 and 6,804,942, which more fully describe tape T, are hereby incorporated by reference. Tape T includes warp fibers 11 and weft fibers 12, which are joined together with stitching 14. The resulting tape T provides an open lattice structure that can then be impregnated with epoxy, vinyl ester or other resin leaving a matrix of holes between the resin loaded fibers.

As shown in FIG. 2A, the tape T can then be passed through a polymer extruder 42 in which a molten polymer can be introduced under pressure through an inlet 44 and into the matrix of holes in the tape T.

In FIG. 3 the tape A-3, is constructed by extruding a profile or preferred shape that has longitudinal grooves 17b along its length. The profile of the grooved polymer layer 16 can be formed from the shape of the opening or cross section of a die. The grooves 17b may be filled with composite material, resin, adhesive or paste made from short fibers and resin or other filler materials 17c, either during or prior to the application of the tapes to the core C. The resultant tape A-3 can be welded on its bottom surface 16 to a compatible tube C of a compatible material and bonded to the layer or laminate 15 above the polymer layer 16.

Figure 4:
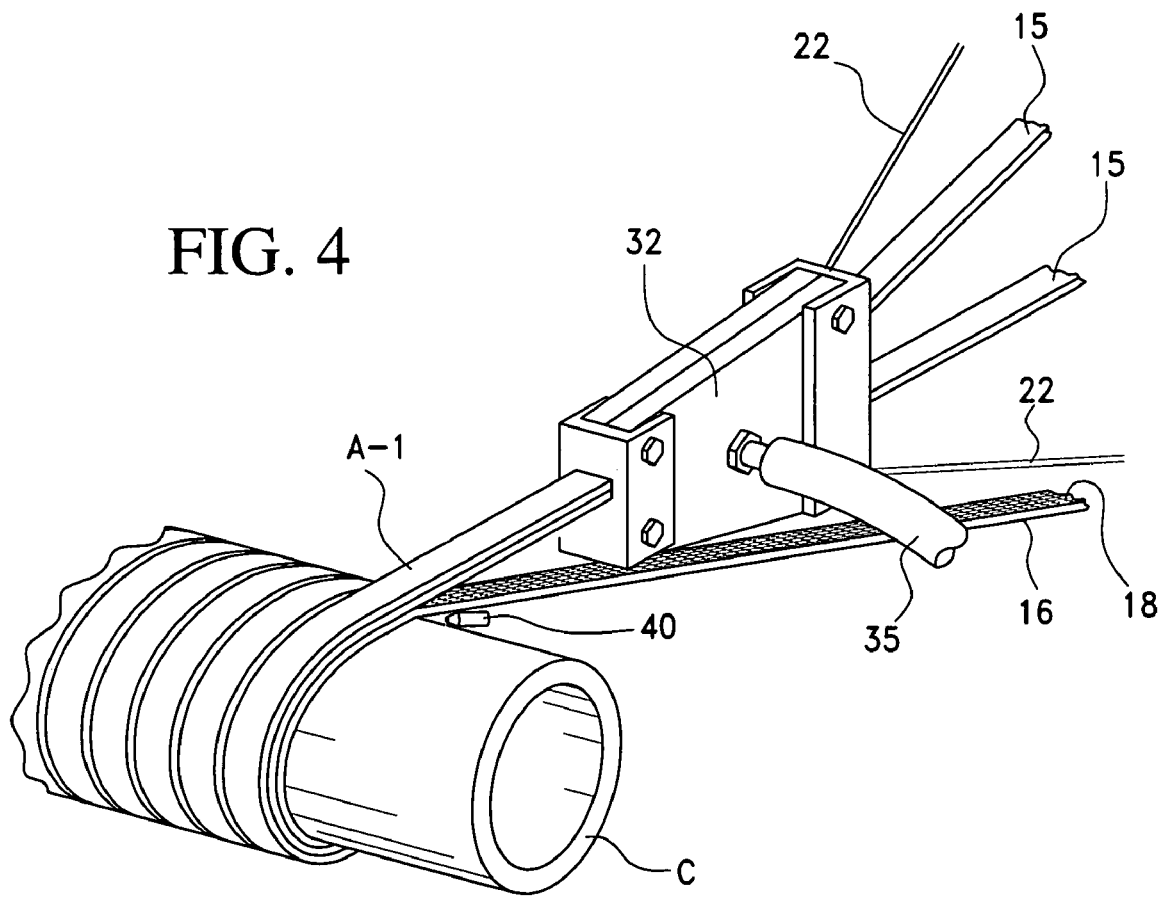
FIG. 4 is an isometric, schematic illustration of a method of construction of the invention showing the plenum and wrapped core.
Figure 5:
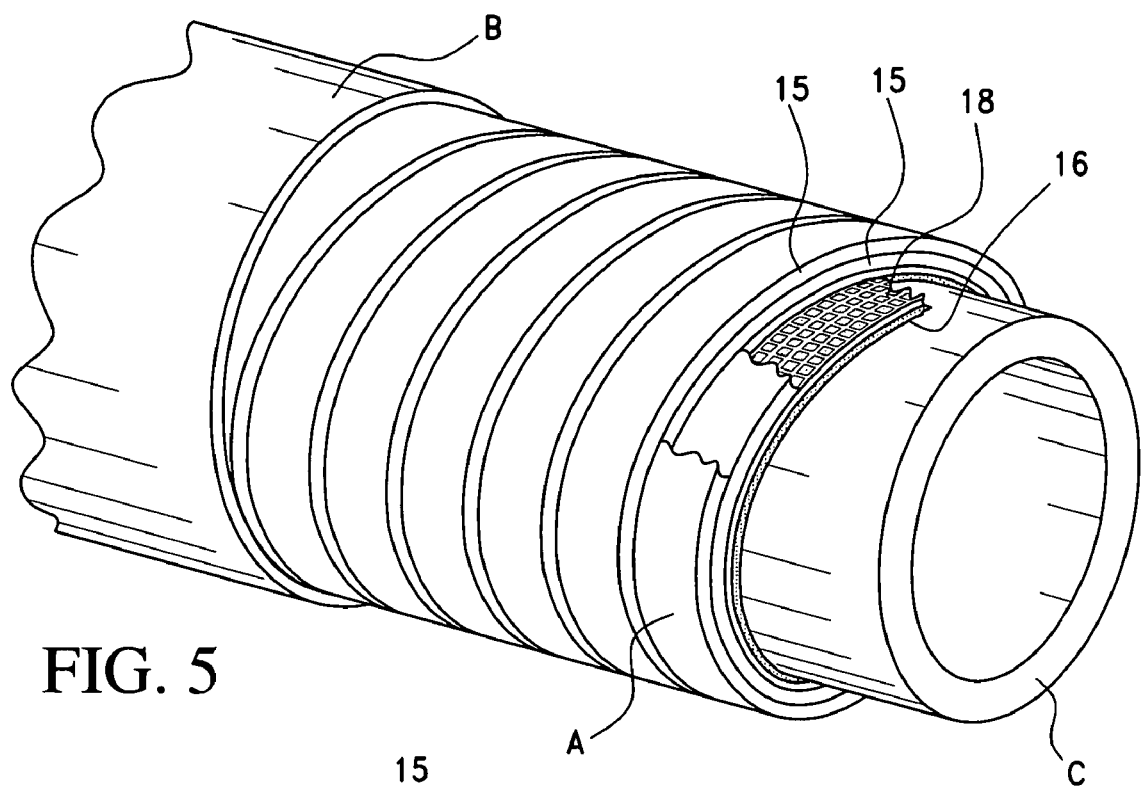
FIG. 5 is an isometric view of a pipe made in accordance with this invention, showing the arrangement of the tapes wound on the fluid conducting tube or core.

FIG. 4 shows a preferred method of producing the tape A-1. The perforated laminate 18 is shown outside of the resin plenum, and parallel to the tapes 15, which are passed through a resin plenum 32 while resin is injected into the inlet 35. The resin is generally injected under pressure. The resin will fill the grooves in the tape and lock the stack of laminates 15 together when the resin cures. The perforated laminate 18 may also be passed through the resin plenum 32 together with the tapes 15, wherein the perforated laminate 18 is bonded together with the tapes 15 with the resin or other bonding material. It is to be understood that the alternative embodiments of the tapes A-2 or A-3 may also be applied to the core C as seen in FIG. 5. A holdback wire 22 is shown attached to the top of the resin plenum 32. The holdback wire 22 is used to secure the position of the plenum 32 during the fabrication process. Additional holdback wires 22 may be positioned on the bottom of the plenum 32 or the plenum 32 may be supported with an alternative, or well known structure.

The polymer layer 16 can be bonded to the surface of the pipe or core C by heating the surfaces being joined with a suitable heater 40. The heating and pressure from winding the tape A to the surface of the core C results in a welded bond between the polymer layer 16 and the surface of the core C. The polymer layer 16 can also be bonded with an adhesive or other bonding agent.

FIG. 5 shows the inventive pipe after the tape has been applied to the core C. The polymer layer 16 is shown bonded to the core C and also bonded to the perforated layer 18. The resulting configuration provides reinforced hoop strength for the above described structure to prevent the collapse of the pipe in the event of a reduced pressure in the pipe or core C as explained above. Additional layers of laminate 15 are shown wrapped outside of the perforated layer 18. An outer jacket B is shown in FIG. 5, which provides abrasion and chemical resistance is shown outside of the layers of laminate 15.

The embodiment shown in FIG. 1B, which may include only a polymer layer 16b with depending polymer 17b in upper layer 18b, on the outside upper layer may be wrapped around the core C to provide a modified construction of FIG. 1B which provides wear resistance, corrosion protection and a surface that is suitable for identification purposes.

Figure 6A:
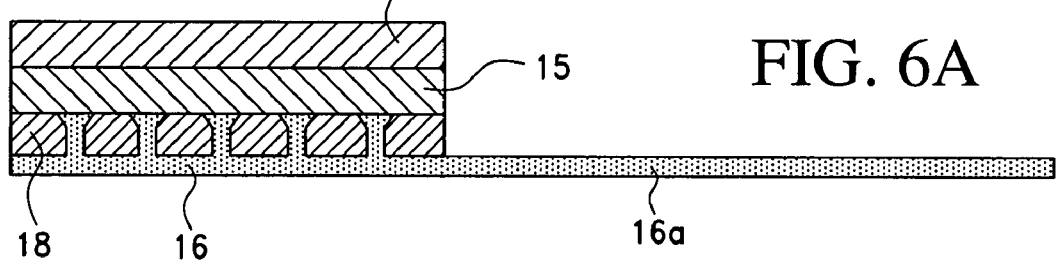
FIG. 6A is a view of an embodiment of the invention showing a flap extending beyond the width of the laminate.
Figure 6B:
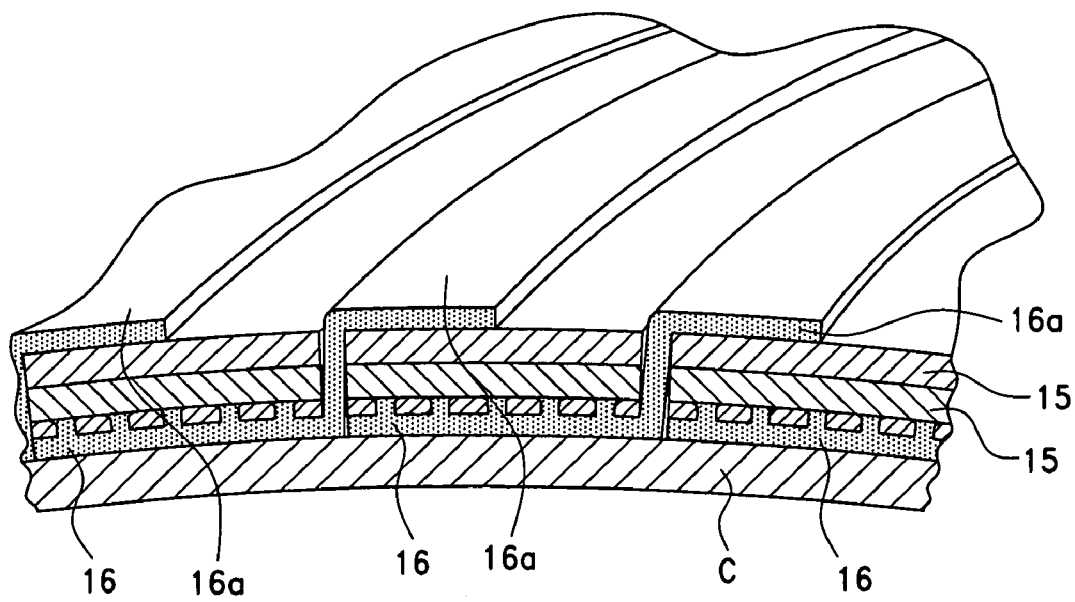
FIG. 6B is a view of an embodiment of the invention showing flaps extending over adjacent tapes.

In FIG. 6A, an alternative embodiment is shown that includes a polymer flap 16a that extends the polymer beyond the width of the layers of laminate 15 and perforated laminate 18. As shown in FIG. 6B, the attached polymer flap 16a extends up and over the adjacent layers of laminate 15 and can be used to separate spiral stacks of reinforcing layers as shown.

The foregoing disclosure and description of the invention are illustrative and explanatory thereof, and various changes in the details of the illustrated apparatus and construction and method of operation may be made without departing from the spirit of the invention.

What is claimed is:

1. In a polymeric tubular core that is subject to internal fluid pressure, and which has a plurality of reinforcing tapes wrapped thereon for resisting the internal fluid pressure, and wherein each tape which is in contact with said core has an inner surface in contact with the external surface of said core, the improvement comprising:
- a. forming a plurality of laterally spaced openings in said tape that are in communication with the external surface of said core;
- b. embedding a polymer in said openings; and
- c. bonding the embedded polymer in the tape to the polymer of the core, whereby a collapse of the core is prevented when a reduction in internal fluid pressure in the core occurs.

2. The method of claim 1 wherein said bonding comprises welding the embedded polymer in the tape to the polymer of the core by applying heat.

3. The method of claim 1 wherein said bonding comprises applying an adhesive between the embedded polymer in the tape and the polymer of the core.

4. A reinforced flexible pipe comprising:
- a. a tubular core member;
- b. a plurality of reinforcing tape members wrapped on said core member;
- c. the innermost tape member having a plurality of openings in communication with the external surface of said core member; and
- d. polymer material embedded in said openings in said innermost tape member wherein said polymer material contacts said core member and said innermost tape member.

5. The system of claim 4, wherein:
the openings in said innermost tape member taper outwardly toward the outer surface of said innermost tape member.

6. The system of claim 4, wherein:
the outermost tape member has a plurality of openings therethrough.

7. The system of claim 6, wherein:
said openings and the outer surface of said outermost tape member include a polymer material whereby said polymer on said outermost tape member provides a bonded wear resistant surface for said reinforced flexible pipe.

8. The system of claim 4 wherein:
said polymer material extends beyond the edge of said tape member to form an overlapping layer wherein said overlapping layer extends over the top of an adjacent tape member.

9. The system of claim 4 wherein:
some of said plurality of openings extend longitudinally in the tape, are laterally spaced apart, and the polymer therein is in communication with the external surfaces of said core member for forming a bond with said core member.

10. A reinforced flexible pipe assembly, comprising:
- a. a plurality of reinforcing tape members wrapped on an inner core;
- b. the outermost tape member having a plurality of openings; and
- c. polymer material embedded in said openings in said outermost tape member whereby said polymer on said outermost tape member provides a bonded wear resistant surface for said reinforced flexible pipe.

* * * * *